(12) United States Patent
Endo (10) Patent No.: US 6,647,104 B1
(45) Date of Patent: Nov. 11, 2003

(54) SPEECH SYSTEM, EXTENSION COMMUNICATION TERMINAL, AND METHOD OF UP-LOADING DATA FOR COMMUNICATION SYSTEM

(75) Inventor: Hiroshi Endo, Koriyama (JP)

(73) Assignee: Hitachi Telecom Technologies, Ltd., Koriyama (JP)

(*) Notice: Subject to any disclaimer, the term of this patent is extended or adjusted under 35 U.S.C. 154(b) by 0 days.

(21) Appl. No.: 09/424,651

(22) PCT Filed: Mar. 25, 1999

(86) PCT No.: PCT/JP99/01527

§ 371 (c)(1),
(2), (4) Date: Feb. 18, 2000

(87) PCT Pub. No.: WO99/51042

PCT Pub. Date: Oct. 7, 1999

(30) Foreign Application Priority Data

Mar. 27, 1998 (JP) .......................................... 10-081175

(51) Int. Cl.[7] .............................................. H04M 1/00
(52) U.S. Cl. ................................... 379/157; 379/201.05
(58) Field of Search ............................. 379/201, 93.12, 379/211.02, 212, 157

(56) References Cited

U.S. PATENT DOCUMENTS 5,469,501 A * 11/1995 Otsuka ..................... 379/246
5,724,417 A * 3/1998 Bartholomew et al. ..... 235/380

FOREIGN PATENT DOCUMENTS

| JP | 1243693 | 9/1989 |
| JP | 40614457 | 2/1992 |
| JP | 5014521 | 1/1993 |
| JP | 6121035 | 4/1994 |
| JP | 6165239 | 6/1994 |

* cited by examiner

Primary Examiner—Fan Tsang
Assistant Examiner—Olisa Anwah
(74) Attorney, Agent, or Firm—Antonelli, Terry, Stout & Kraus, LLP

(57) ABSTRACT

A telephone system requiring no upload of station data which is reset or set after a seat change even if the station data is not uploaded to a data management equipment whenever the operation change the station data of an extension communication terminal. Each of the extension communication terminals judges, on receiving a seat-change instruction, whether or not its station data is changed. If the station data is judged to be changed, the station data is uploaded to the data management equipment through a switching system.

6 Claims, 9 Drawing Sheets

TABLE OF STARTING ADDRESSES FOR EACH BLOCK

| STARTING ADDRESS FOR STATION DATA OF BLOCK 0 | BLOCK 0 |
|---|---|
| STARTING ADDRESS FOR STATION DATA OF BLOCK 1 | BLOCK 1 |
| STARTING ADDRESS FOR STATION DATA OF BLOCK 2 ⋮ | BLOCK 2 ⋮ |
| STARTING ADDRESS FOR STATION DATA OF BLOCK 63 | BLOCK 63 |

SPEECH SYSTEM, EXTENSION COMMUNICATION TERMINAL, AND METHOD OF UP-LOADING DATA FOR COMMUNICATION SYSTEM

TECHNICAL BACKGROUND

This invention relates to up-load technology for uploading station data in a telephone system, more particular a dealing telephone system, comprising a plurality of extension communication terminals each having station data, a data management equipment for managing the station data of the plurality of extension communication terminals, and a switching system which connects the plurality of extension communication terminals and data management equipment.

PRIOR ART

Telephone systems comprising private branch exchange (PBX) and a plurality of extension communication terminals which are accommodated in the PBX are widely used in a work place and the like. Particularly, in work places, such as banks or securities firms, where dealing work is performed, so called dealing telephone systems are widely used wherein the extension communication terminals themselves have station data that allow dealers to select and to speak in an instant to a desired customer from among many customers, and the system is configured to provide various services to the dealers being operators of the extension communication terminals based on the station data.

Up until now there have been such dealing telephone systems as disclosed in Japanese Patent Application Publication No. Hei 4-61457 or Japanese Patent Application No. Hei 6-121035. In these dealing telephone systems, the station data of the plurality of extension communication terminals accommodated in the PBX were controlled as one batch, so a data management equipment is connected to the plurality of extension communication terminals via the PBX.

DISCLOSURE OF THE INVENTION

In the conventional dealing telephone system, if a operator changes seats (the extension communication terminal being used), in order to use the operating environment (extension number or station data) of the extension communication terminal before changing seats also at the extension communication terminal after changing seats, a seat-change process is performed for the extension communication terminal after changing seats in accordance to the following procedure.

(1) First, the PBX is notified of the change in extension number, to change the extension number of the extension communication terminal after changing seats to the extension number that was used by the extension communication terminal before changing seats.

(2) Next, the changed extension number is sent to the data management equipment, and station data for the extension communication terminal according to the changed extension number (the extension communication terminal that was used before changing seats) is downloaded from the data management equipment.

In the conventional dealing telephone system, if the station data of the extension communication terminal that was used before changing seats is changed, and that changed data is not reflected in the data management equipment, then the no-changed station data will be downloaded to the extension communication terminal after changing seats.

This problem can be dissolved if each time the station data of the extension communication terminal being used by the operator is changed, the operator uploads the changed station data to the data management equipment. However, due to carelessness, the operator may forget to upload the changed station data. If the seat is changed in this kind of situation, the operator faces a problem of having to reset the station data at the extension communication terminal after the seat change. In addition, the operator also faces a problem of having to upload the set station data to the data management equipment.

SUMMARY OF THE INVENTION

In consideration of the condition mentioned above, an object of the present invention is to provide a telephone system in which it is not necessary to reset the station data or to upload the station data after it has been reset when the operator changes seats, even though the station data is not uploaded to the data management equipment each time the station data for the extension communication terminal being used is changed.

In order to solve the aforementioned problems, the present invention is a telephone system comprising a plurality of extension communication terminals each having station data; a data management equipment which manages the station data of the plurality of the extension communication terminals, and private branch exchange (PBX) which connects the plurality of extension communication terminals and data management equipment; wherein:

the extension communication terminals comprise:
  instruction receiving means for receiving seat changing instructions;
  judgment means for judging whether or not its own station data has been changed, in accordance with seat-change instructions by the instruction receiving means; and
  upload means for uploading data to the data management equipment via the PBX if its own station data is judged by the judgment means to have been changed; and
the data management equipment comprises an update means for updating station data of the extension communication terminal which the data management equipment itself manages in accordance with the station data uploaded from the extension communication terminal.

With the present invention, when the extension communication terminal receives a seat-change instruction, the station data of its own is judged automatically whether it has been changed or not, and if it has been changed, that station data is uploaded to the data management equipment.

Accordingly, for example, in a case where two operators switch seats such that they also switch extension communication terminals with each other, if each operator entered a seat-change instruction at the extension communication terminal just using (before the seat change), when each operator changes the extension number at the extension communication terminal after the seat change to the extension number of the extension communication terminal that was being used before the seat change, and sends that extension number to the data management equipment, it is possible to download from the data management equipment the latest station data for the extension communication terminal that was being used before the seat change.

In other words, after changing seats, the operator does not need to reset the station data and upload that station data, even though station data is not uploaded to the data management equipment each time the station data of the extension communication terminal being used by the operator is changed.

In the present invention, it is also possible to further provide a control means for dividing the own station data into a plurality of blocks; and to configure the judgment means to judge in block units, whether or not its own data has been changed on receiving seat-change instruction by the instruction receiving means, and to configure the upload means to upload to the data management equipment, only the data that corresponds to the block or blocks of its own station data that have been judged to be changed is uploaded, if its own data is judged by the judgment means to have been changed.

In this case, when data from the extension communication terminal is uploaded to the data management equipment, the data management equipment updates with the uploaded data, only data corresponding to the uploaded data of the station data of the extension communication terminal that the data management equipment itself manages.

In this way, since only the portion of station data of the extension communication terminal that are actually changed are uploaded, it is possible to reduce the time required for uploading, and to make uploading more efficient.

DETAILED DESCRIPTION OF THE INVENTION

One embodiment of the present invention will be described below.

Figure 1:
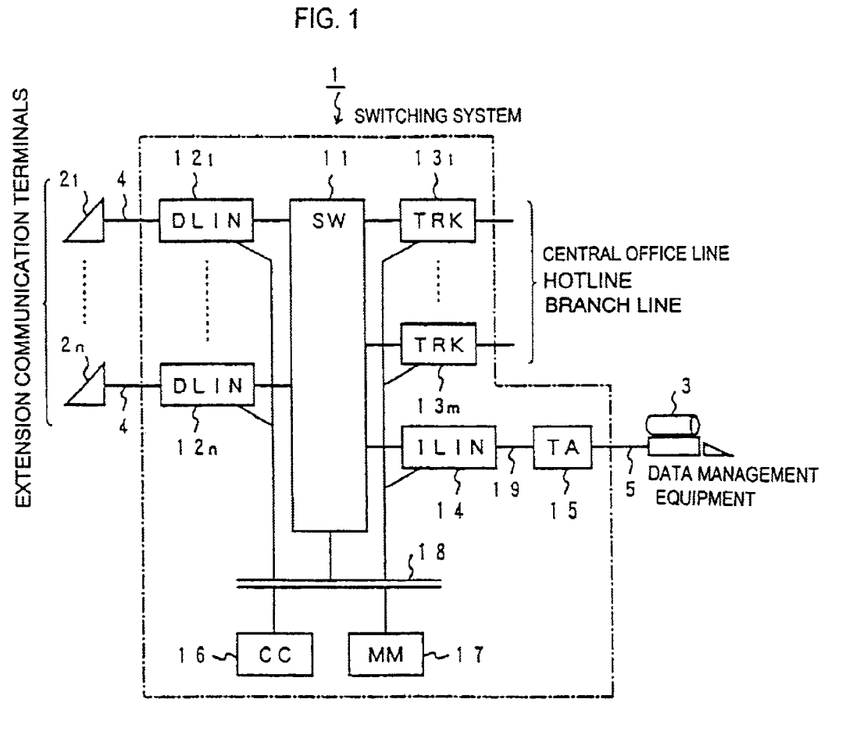
FIG. 1 is a schematic diagram of the dealing telephone system for which a first embodiment of the present invention is applied.

FIG. 1 is a schematic drawing of a dealing telephone system to which one embodiment of the present invention is applied.

As shown in FIG. 1, the dealing telephone system of this embodiment comprises a switching system 1, extension communication terminals $2_1$ to $2_n$ which are connected to the switching system 1, and a data management equipment 3, which is also connected to the switching system 1.

First, the switching system 1 will be explained.

The switching system 1 comprises a switch (SW) 11 which switches the telephone(communication) path, dedicated-line circuits (DLIN) $12_1$ to $12_n$, which accommodate extension communication terminals $2_1$ to $2_n$ and connect them to the switch 11, trunks (TRK) $13_1$ to $13_m$, which accommodate central office lines, hotlines, and branch lines, and connect them to the switch 11, a terminal adapter (TA) 15, which is connected to the data management equipment 3, I interface line (ILIN) circuit 14 for connecting the data management equipment 3 to the switch 11 via the terminal adapter 15, a central controller (CC) 16, and a main memory (MM) 17.

Here, the central controller 16, main memory 17, dedicated-line circuits $12_1$ to $12_n$, trunks $13_1$ to $13_m$ and I interface extension circuit 14 are connected together via a control system bus 18. Moreover, the dedicated-line circuits $12_1$ to $12_n$, are connected to the corresponding extension communication terminals $2_1$ to $2_n$ by connection cable 4 for sending and receiving voice and call control signals. Furthermore, the I interface line circuit 14, terminal adapter 15 and data management equipment 3 are connected by connection cable 19 and connection cable 5, which send and receive data by the ISDN interface.

The main memory 17 stores a program for performing services such as switching, control data and station data.

The central controller 16 reads and executes the program stored in the main memory 17 to control the extension communication terminals $2_1$ to $2_n$, which are accommodated in the switching system 1 and the components of the switching system 1. In addition, it performs services such as switching.

The switch 11 is placed under the control of the central controller 16, and performs switching such as connecting or disconnecting between the dedicated-line circuits $12_1$ to $12_n$, trunks $13_1$ to $13_m$ and I interface-line circuit 14.

The dedicated-line circuits $12_1$ to $12_n$ are placed under the control of the central controller 16, and control the sending and receiving of signals to or from the extension communication terminals $2_1$ to $2_n$ to which they are connected.

The trunks $13_1$ to $13_m$ are placed under the control of the central controller 16, and control the receiving of signals from the central office lines, hotlines or branch lines connected thereto, as well as control the sending of signals to these central office lines, hotlines or branch lines.

Next, the extension communication terminals $2_1$ to $2_n$ will be explained.

The extension communication terminals $2_1$ to $2_n$ each contain station data, and are configured such that they are capable of supplying various services to the operator (dealer) using that station data. For example, it has a function that uses multiple line data (data such as line number, line name (for example customer's name), trunk identification, trunk circuit position, etc. of a target line), which are stored as part of the station data, to divide multiple line names over several pages to output to the display, or it has an outgoing or incoming call response function which displays the operating state for any line of the multiple line data which it stores to support outgoing or incoming call for these lines. Moreover, by pre-registering function-key data as part of the station data, it is possible to freely assign the reception of service requests that can be supplied by the extension communication terminals $2_1$ to $2_n$ to the function keys on the control panel (description will be made later).

In this embodiment, function key data is pre-registered such that the reception of the request for starting the seat-change process program which will be described later is assigned to one of the function keys.

Figure 2:
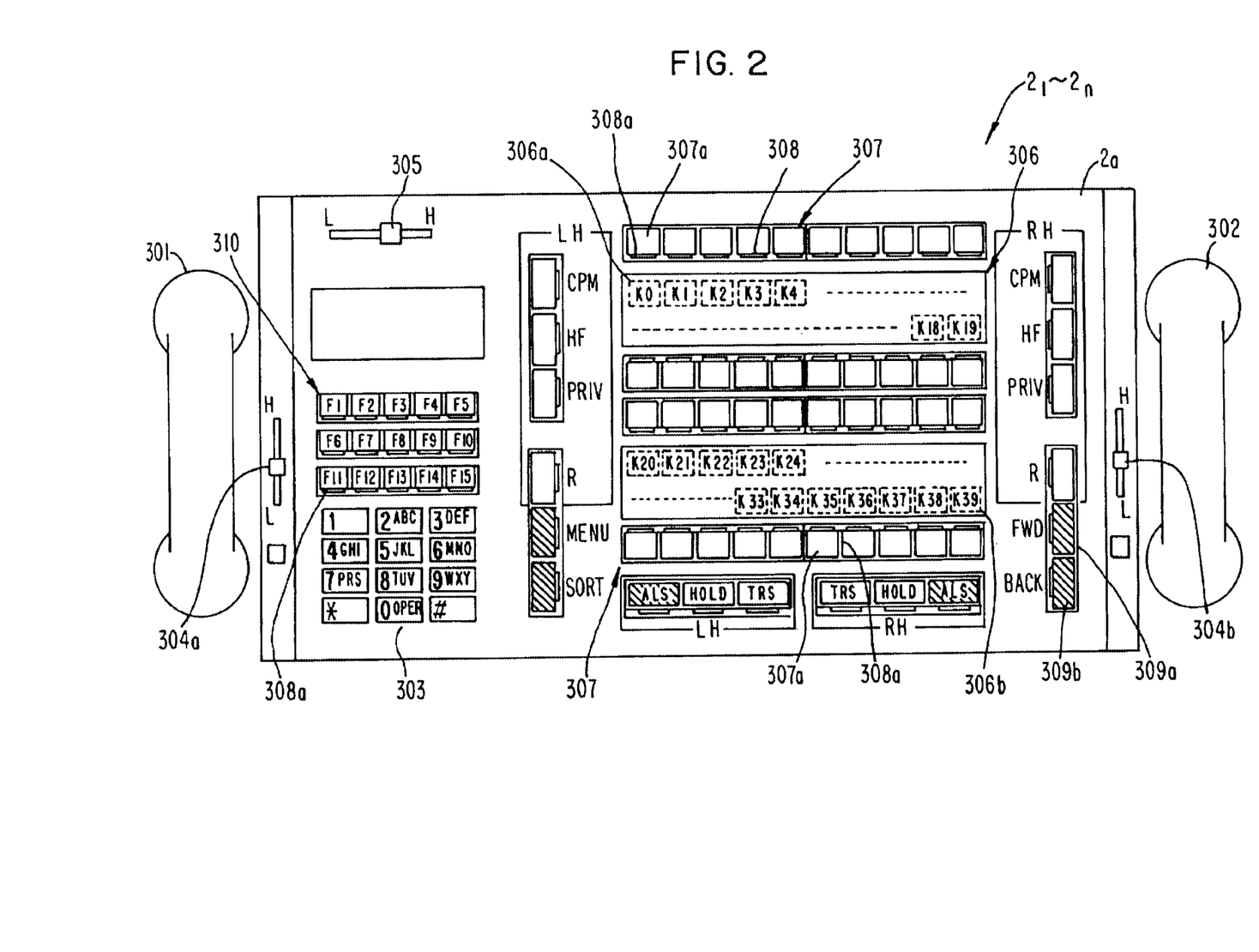
FIG. 2 is a diagram showing the panel for extension communication terminals $2_1$ to $2_n$.

FIG. 2 is a schematic diagram of the panel for the extension communication terminals $2_1$ to $2_n$.

Here, reference numeral 2a is the panel of the extension communication terminal $2_1$ to $2_n$, reference numerals 301 and 302 are for the left and right telephone handsets, respectively.

As shown in FIG. 2, the panel 2a comprises a dial-key group 303 for receiving dialed numbers, sound adjustment volume 304a for adjusting the received sound for the left handset 301, and sound adjustment volume 304b for adjusting the received sound for the right handset 302, a ringer adjustment volume 305 for adjusting the ringer sound, a display 306 for displaying the line names or the like of the plurality of line data stored as part of the station data, function-key group 310, a FWD key 309a, and a BACK key 309b.

Besides for receiving the input of dialing number, the dial-key group 303 functions as data input means for receiving data input such as line data or function-key data, which are registered as part of the station data.

Each of the function keys of the function-key group 310 can be assigned, by function-key data that is registered as part of the station data, to receive requests for services such as the function for dividing the line names over several pages to display on the display 306, or the function for displaying the operating status of the lines in connection with the plurality of line data on the display 306.

As mentioned above, in this embodiment, the reception of the request for starting the seat-change process program which will be described later is assigned to one of the function keys in the function-key group 310. In addition, the reception of the request for starting the station-data change process program which will be described later is assigned to another function key.

There is provided a display lamp for each of the function keys of the function-key group 310, making it possible to visually display the status of the functions assigned to the function keys.

The display 306 comprises a current-page display unit 306a and an another-page incoming-call display unit 306b; the current-page display unit 306a divides the line names of the plurality of line data registered as part of the station data into several pages and displays at K1 to K35 the line names contained in one of the several pages, and the another-page incoming-call display unit 306b displays at K36 to K40 the line names contained in the pages other than the page displayed in the current-page display unit 306a and the lines specified by the corresponding line names are having incoming calls, Both the current-page display unit 306a and the another-page incoming-call display unit 306b have line keys 307a (all together they make up the line-key group 307) provided plurally, each corresponding to one of the line names K1 to K40 that are displayed on these display units, and which are used for selecting the corresponding lines, and display lamps 308a (all together they make up the display-lamp group 308) for visually displaying the operating status of the corresponding lines.

The display 306 can display only the lines that are in the hold state, or can display the lines that are accommodated in the extension communication terminals $2_1$ to $2_n$. Using function-key data that is registered as part of the station data, it is possible to realize this by assigning various page switching keys for switching the contents (page) displayed on the display 306 to one of the function keys of the function-key group 310.

The FWD key 309a is a key for turning forward the pages displayed on the current-page display unit 306a in order, and the BACK key 309b is a key for turning backward to the pages displayed on the current-page display unit 306a in order.

Figure 3:
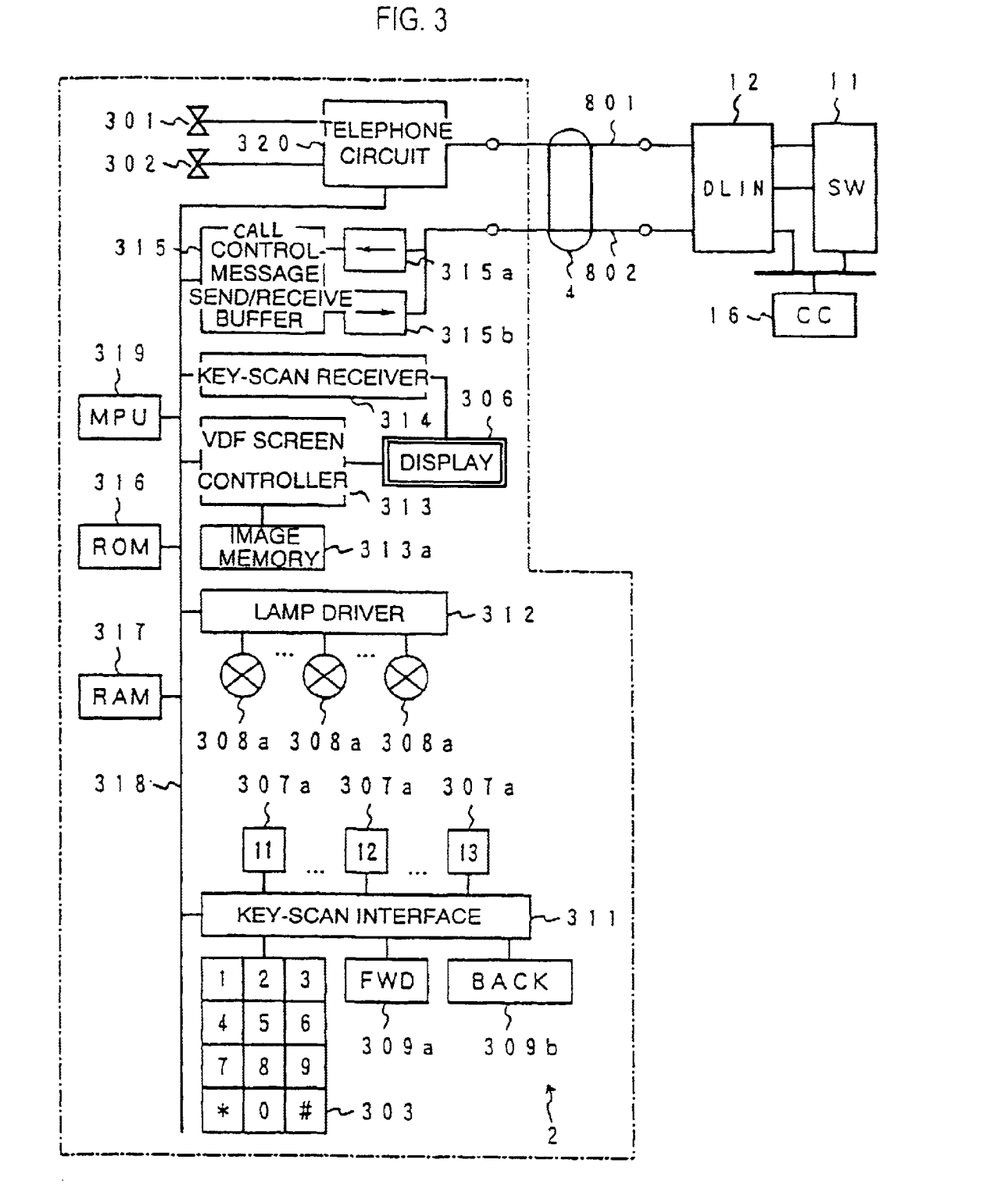
FIG. 3 is a block diagram showing the configuration of the inside of extension communication terminals $2_1$ to $2_n$.

FIG. 3 is a block diagram which shows the configuration on the inside of the extension communication terminals $2_1$ to $2_n$.

Here, the key-scan interface 311 scans the opening and closing of the keys in the dial-key group 303, FWD key 309a, BACK key 309b, line-key group 307, or function-key group 310, and detects whether or not the keys have been pressed.

The lamp driver 312 lights up each of the display lamps 308a of the display lamp group 308.

The VFD screen controller (hereafter, simply called the screen controller) 313 drives and controls the display screen of the display 306. The screen controller 313 has an image memory 313a which stores graphic data for displaying graphic characters such as alphabetic and numeric characters, and based on the graphic data stored in the image memory 313a, it generates image data and output and displays the generated image data on the display 306.

The key-scan receiver 314 detects the pressed status of the touch panel on the display screen of the display 306.

The call control-message send/receive buffer 315 is a buffer for sending or receiving call control messages to or from the switching system 1 via the control channel 802. The control-message send/receive buffer 315 is connected to a receiving circuit 315a, which receives call control messages from the switching system 1 via the signal channel 802 of the basic ISDN interface, and to a sending circuit 315b, which sends call control messages to the switching system 1 via the signal channel 802.

The left and right handsets 301, 302 are connected to the telephone channel 801 via the telephone circuit 320.

The RAM 317 stores data which will be potentially changed. The RAM 317 comprises a work area where the MPU 319 which will be described below performs work, a station data area where the station data are stored, a table area which stores the block change (Y/N) table for identifying in block units the locations in the station data stored in the station data area that have been changed, and an area for storing extension numbers that are assigned for that extension communication terminal.

Here, the station data and the block change (Y/N) table will be explained.

Figure 4:
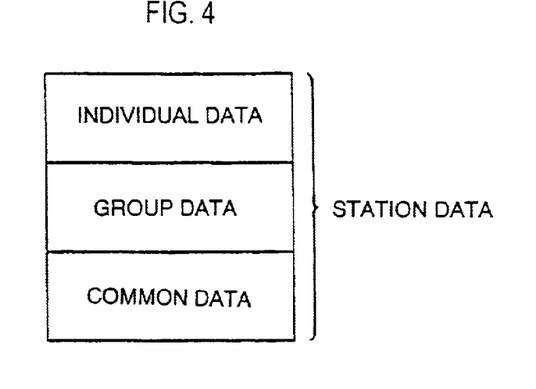
FIG. 4 shows the data configuration of the station data.

FIG. 4 is a diagram showing the data configuration of the station data.

As shown in FIG. 4, the station data comprises individual data which the operator can freely set for each extension communication terminal $2_1$ to $2_n$, group data which is shared by a group of some of the extension communication terminals, and common data which is common to all of the extension communication terminals. The function-key data and line data described above are handled as individual data or group data.

Figure 5:
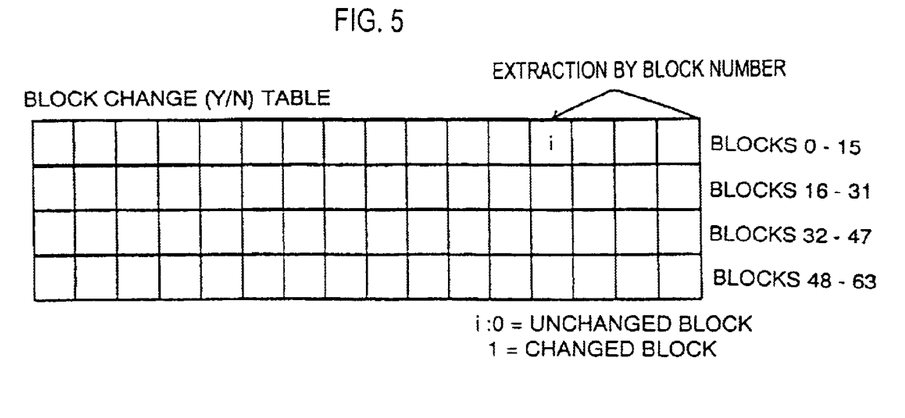
FIG. 5 is a diagram which explains the block change (Y/N) table.

FIG. 5 is a diagram for explaining the block change (Y/N) table.

As shown in FIG. 5, the station data area of the RAM 317 is managed in blocks having a specified number of bits, and whether or not the station data has been changed is registered in the block change (Y/N) table in block units.

The ROM 316 stores fixed data that do not change. The ROM 316 comprises a program area for storing programs such as the call control program, seat-change process program, station-data-change process program and programs for other services, and a table area, which stores the starting address table for each block having the starting addresses of each of the blocks in the station data area shown in the block change (Y/N) table that is stored in the table area of the RAM 317.

Here, the starting addresses table for each block will be explained.

Figure 6:
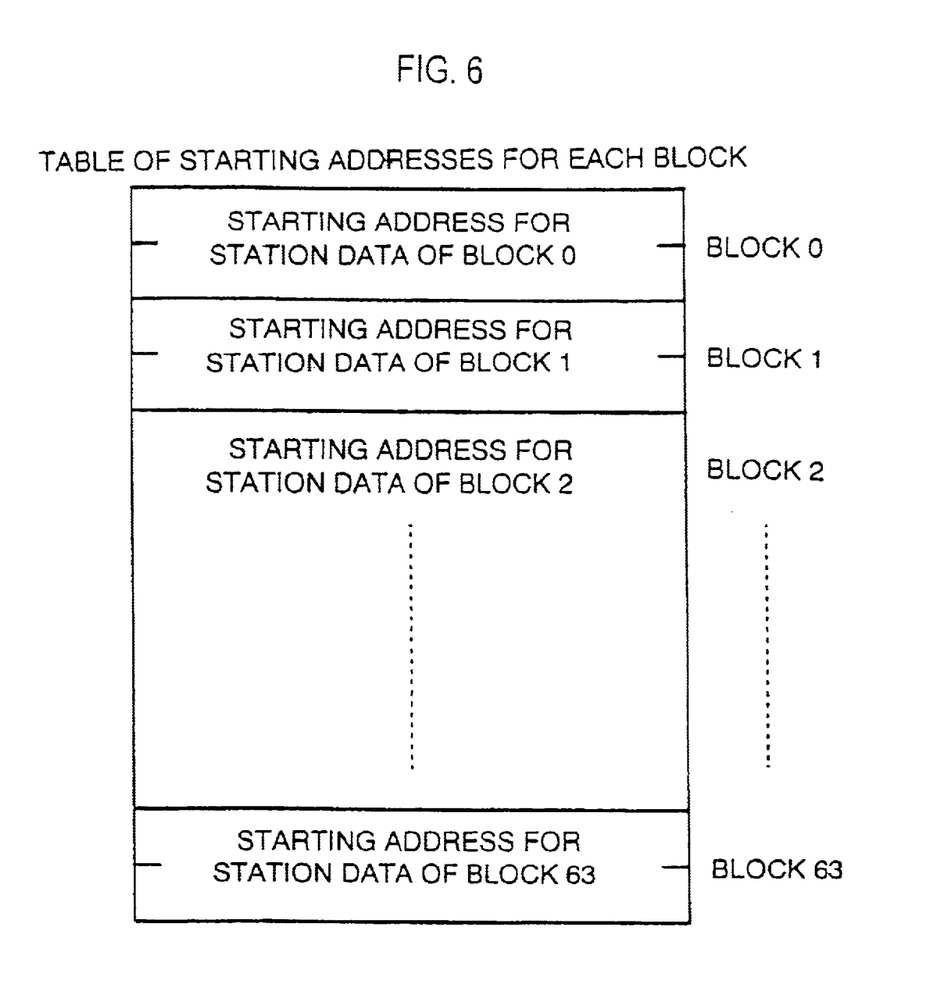
FIG. 6 is a diagram which explains the table of starting addresses for each block.

FIG. 6 is a diagram which explains the table of starting addresses for each block.

As shown in FIG. 6, starting addresses assigned for each data corresponding to the block number of the blocks shown in the block change (Y/N) table are stored in the table of starting addresses for each block.

The MPU 319 controls all of the component elements of the extension communication terminals. In addition, by loading and executing the various programs stored in the ROM 316, it performs various services such as the call control process, the seat-change process which will be described below or the station-data change process.

The control system bus 318 connects the component elements of the extension communication terminals.

Next, the data management equipment 3 will be explained.

The data management equipment 3 centralizedly manages the station data that each of the extension communication terminals $2_1$ to $2_n$ has. This data management equipment 3 is realized with an information processing equipment such as a personal computer with a communication feature.

Many methods may be considered and any can be used as the method for managing data, such as the method of managing the station data of the extension communication terminals $2_1$ to $2_n$ in units of extension communication terminal or extension number, or the method of hierarchically managing the station data of the extension communication terminals $2_1$ to $2_n$ by dividing it into common data, group data and individual data; in other words, individual data is managed in units of extension communication terminal or extension number, group data is managed in group units of extension communication terminals or extension numbers, and common data is managed all together as one.

However, in order to make it possible to manage the station data of the extension communication terminals $2_1$ to $2_n$ for each block number of the blocks shown in the block change (Y/N) table described above, it is necessary to prepare in advance a block correspondence table with regard to each of the extension communication terminals $2_1$ to $2_n$, which shows the correspondence between the block numbers of the blocks shown in the block change (Y/N) table and the address (address in a memory in the data management equipment 3) of the starting location for storing the data of the block specified by that block number, and relate it with the line number.

Figure 7:
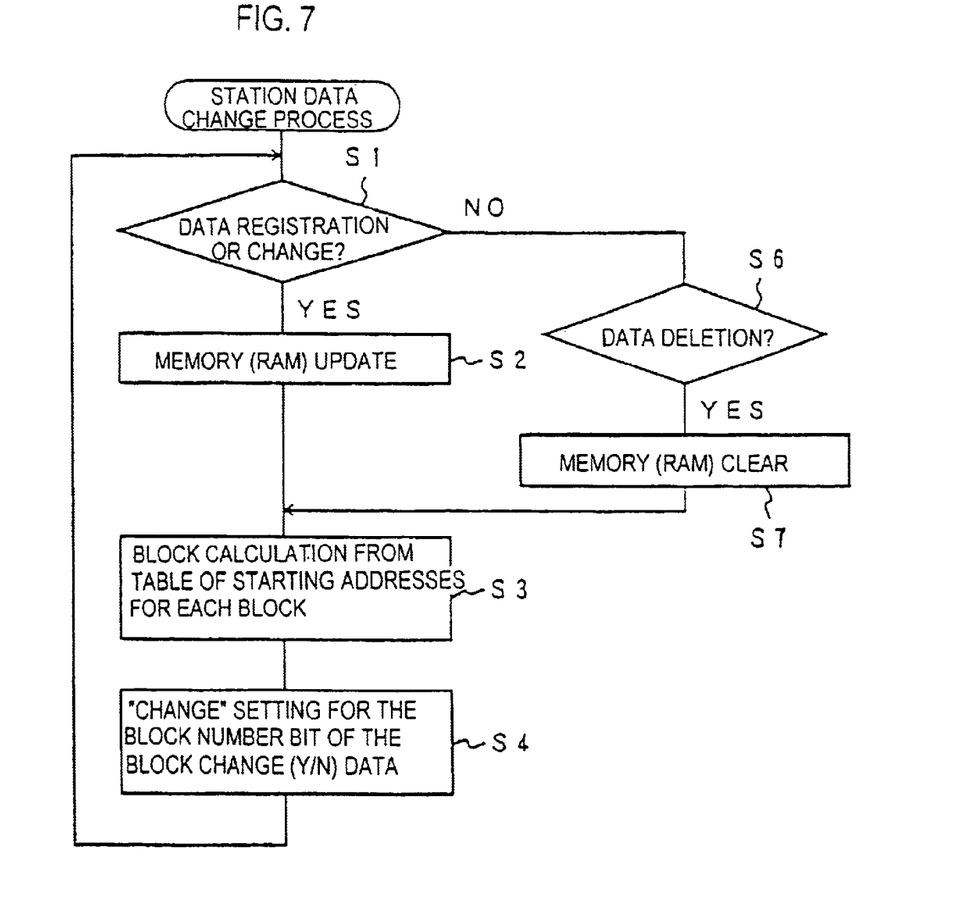
FIG. 7 is a flowchart for explaining the station data change process which is performed for extension communication terminals $2_1$ to $2_n$.

Next, FIG. 7 will be used to explain the process in the dealing telephone system of this embodiment for changing the station data of the extension communication terminals $2_1$ to $2_n$.

FIG. 7 is a flowchart which explains the process for changing the station data performed in the extension communication terminals $2_1$ to $2_n$.

Execution of the flow is started when the station data change program start request is entered from the function keys, and the MPU 319 loads the station data change program from the ROM 316 and execute it. When this happens, the dial-key group 303 functions as the data input means for receiving the station data input. Moreover, a page which supports registration, change or deletion of the station data (line data, function-key data, etc.) is displayed an the display 306, and instruction related to registration, change or deletion is received from the touch panel on the display 306 by way of the key-scan receiver 314.

First, the MPU 319 judges whether or not the instruction from the operator is change or registration of station data (step S1). If the instruction is change or registration, it watts for station data, such as line data or function-key data, to be input, and then registers the input data in the RAM 317, or, it changes part of the station data stored in the RAM 317, for example the station data that is displayed on the display 306, to the station data that was input, (Step S2).

On the other hand, if the instruction from the operator is not a change or registration of station data, then the instruction is judged whether or not it is a deletion of station data (step S6). If it is a deletion, then for example, the station data displayed on the display 306 is deleted from the RAM 317 (step S7).

Next, the MPU 319, based on the address of the registered, changed or deleted station data and the starting address for each block shown in FIG. 6 that is stored in the ROM 316, finds the block number of the station data stored in the RAM 317 that will actually be changed (step S3). In addition it sets information indicating a change for the calculated blook number of the block change (Y/N) table stored in the RAM 317.

The flow of this process ends when, for example, release from the start request for the station-data change process program is input.

Figure 8:
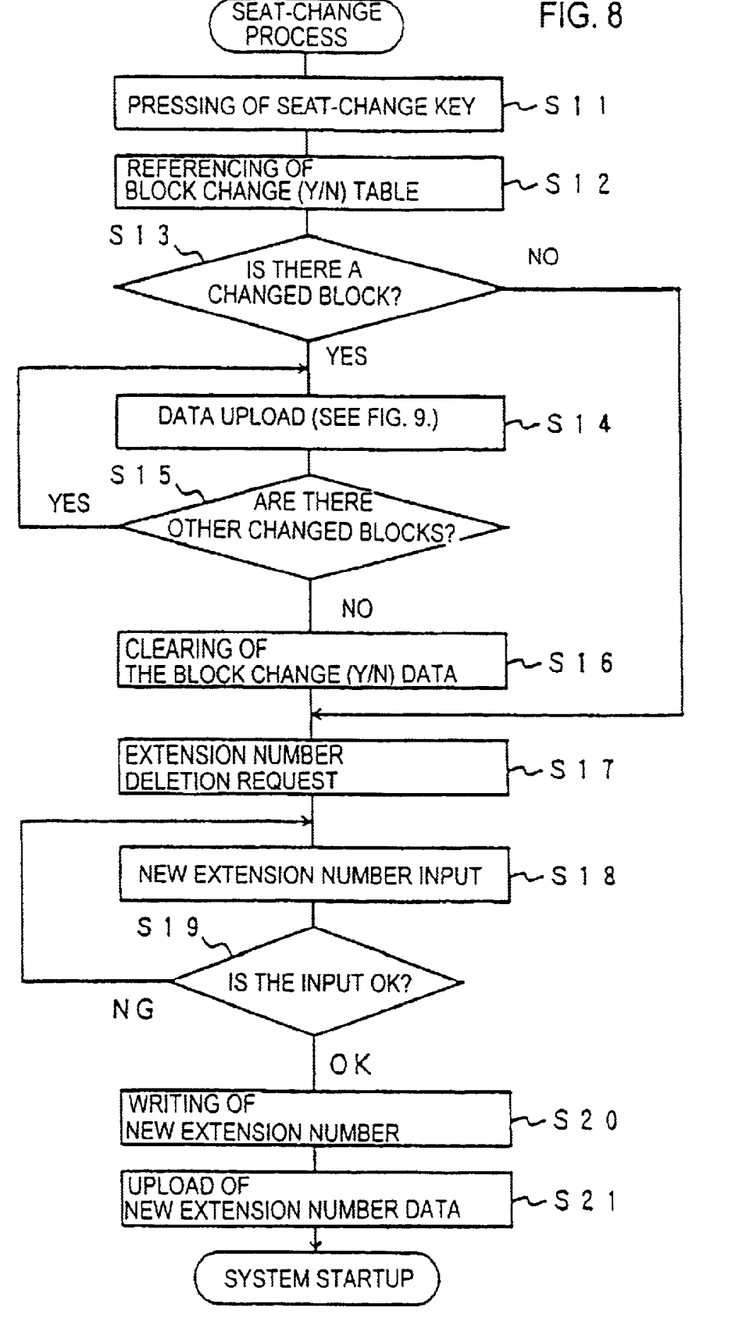
FIG. 8 is a flowchart for explaining the seat-change process which is performed for the dealing telephone system shown in FIG. 1.

Next, FIG. 8 will be used to explain the process in the dealing telephone system of this embodiment for changing the extension communication terminal $2_1$ to $2_n$ (seat change) used by the operator.

FIG. 8 is a flowchart which explains the seat-change process that is performed in the dealing telephone system of this embodiment.

In the extension communication terminals $2_1$ to $2_n$, the MPU 319 judges via the key-scan interface 311 whether or not the function key (seat-change key) of the function-key group 310, which has been assigned to receive the start request for the seat-change process program has been pressed (step S11). If it has been pressed, the MPU 319 loads the seat-change program from the ROM 316, executes it and starts the seat-change process.

First, it references the block change (Y/N) table stored in the RAM 317, and searches for a block for which change information has been set (Step S12). It then judges whether or not there are blocks for which change information has been set (step S13).

If there is a block for which change information has been set, then it references the starting addresses table for each block that is stored in the ROM 316, and acquires the starting address which corresponds to the block number of that block. Then it reads, from the RAM 316, data starting from the acquired starting address up to the specified number of bits for one block unit, and uploads the data to the data management equipment 3 (step S14).

Next, the MPU 319 judges whether or not there are other blocks for which change information has been set (step S15). If there are any such blocks, it returns to step 14 and repeats steps S14 and S15 until all of the blocks, for which change information has been set, have been uploaded.

Figure 9:
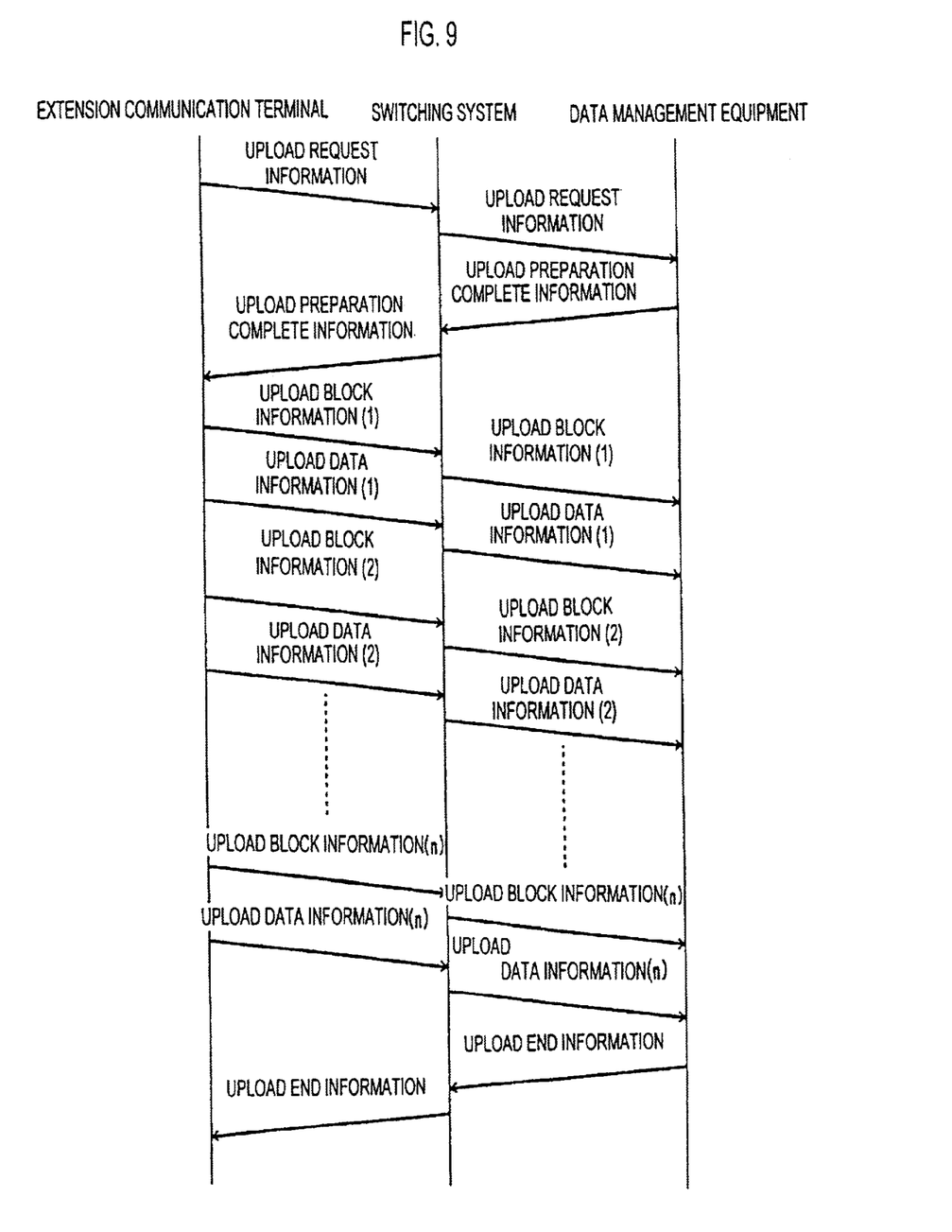
FIG. 9 is a diagram showing the flow of data in the upload process.

FIG. 9 is a diagram showing the flow of data in the upload process.

As shown in FIG. 9, the upload process starts when the extension communication terminals $2_1$ to $2_n$ send upload request information to the switching system 1 via the corresponding dedicated-line circuits $12_1$ to $12_n$.

When the switching system 1 receives the upload request information, it transfers that upload request information to the data management equipment 3 via the I interface line circuit 14 and terminal adapter 15.

When the data management equipment 3 receives the upload request information, it begins preparation for the upload, and after preparation is complete, it sends upload preparation complete information to the switching system 1. When the switching system 1 receives the upload preparation complete information, it transfers that information to the exchange communication terminal $2_1$ to $2_n$ which sent the upload request information.

When the MPU 319 of the exchange communication terminal $2_1$ to $2_n$, which sent the upload request information, receives the upload preparation complete information, first it sends in order upload block number information (1), which indicates the block number of the block for which change information has been set and which was detected in step S13, as well as upload data information (1), which is station data that has been stored in that block, to the data management equipment 3 via the switching system 1.

The data management equipment 3 receives this information and, with the use of the block correspondence table that was prepared in advance, it searches for the address (starting address for storing the block data specified by the aforementioned block number) in its own memory that corresponds to the block number indicated by the upload block number information (1), and then writes the upload data information (1) to the detected address.

Next, the MPU 319 sends in order the upload block number information (2) indicated by the block numbers of the other blocks for which change information has been set and which were detected in step S15, and the upload data information (2), which is station data stored in those blocks, to the data management equipment 3 via the switching system 1.

The data management equipment 3 receives this information and, with the use of the block correspondence table that was prepared in advance, it searches for the address (starting address for storing the block data specified by the aforementioned block number) in its own memory that corresponds to the block number indicated by the upload block number information (2), and then writes the upload data information (2) to the detected address.

Step S15 is repeated until no more blocks for which change information has been set are detected, then after uploading all of the blocks for which change information has been set, the data management equipment 3 sends upload complete information via the switching system 1 to the extension communication terminals $2_1$ to $2_n$ for which uploading was performed, and ends the upload process.

After uploading, for all of the blocks for which change information has been set, is finished, the MPU 319 clears all of the information in the block change (Y/N) table stored in the RAM 317, and the process goes to step S17.

On the other hand, in step 13, if it was determined that there were no blocks for which change information had been set, steps S14 to S16 are not performed, or in other words, station data are not uploaded, and the process goes directly to step S17.

In step S17, the MPU 319 deletes the extension numbers that are assigned for that extension communication terminal from the RAM 317, and then sends deleted extension number information to the switching system 1. The switching system 1 receives it and sets the accommodation state of the received extension numbers as not-accommodated.

Next, the MPU 319 waits for new extension numbers to be input to dial-key group 303 via the key-scan interface 311. After the new extension numbers have been entered, the MPU 319 sends the new extension number information to the switching system 1 (step S18).

The switching system 1 receives it and checks the status of the newly received extension number (for example whether or not they are busy or in use, etc.) and judges whether or not changing seats is possible (possible to change to a new extension number) (step S19). If it is possible to change seats, the switching system 1 sends the extension number change information to the extension communication terminals $2_1$ to $2_n$ which sent the new extension number information. On the other hand, if changing seats is not possible, it sends error information to the extension communication terminals $2_1$ to $2_n$ which sent the new extension number information. When the extension communication terminals $2_1$ to $2_n$ receive the error information, the process returns to step S18 and the extension communication terminals $2_1$ to $2_n$ wait again for new extension numbers to be input.

The MPU 319 of an extension communication terminal $2_1$ to $2_n$ that receives the extension number change information, writes the new extension number information that was input in step S18, to the RAM 317, and the central controller 16 of the switching system 1 recognizes that the extension number has been changed and overwrites the extension number assignment for the accommodation position of the extension communication terminal $2_1$ to $2_n$, which changed the extension number in the station data of the main memory 17, with the new extension number (step S20), Then the MPU 319 downloads the station data (station data of the extension communication terminal with that extension number before the seat change) for the new extension number from the data management equipment 3 (step S21).

Figure 10:
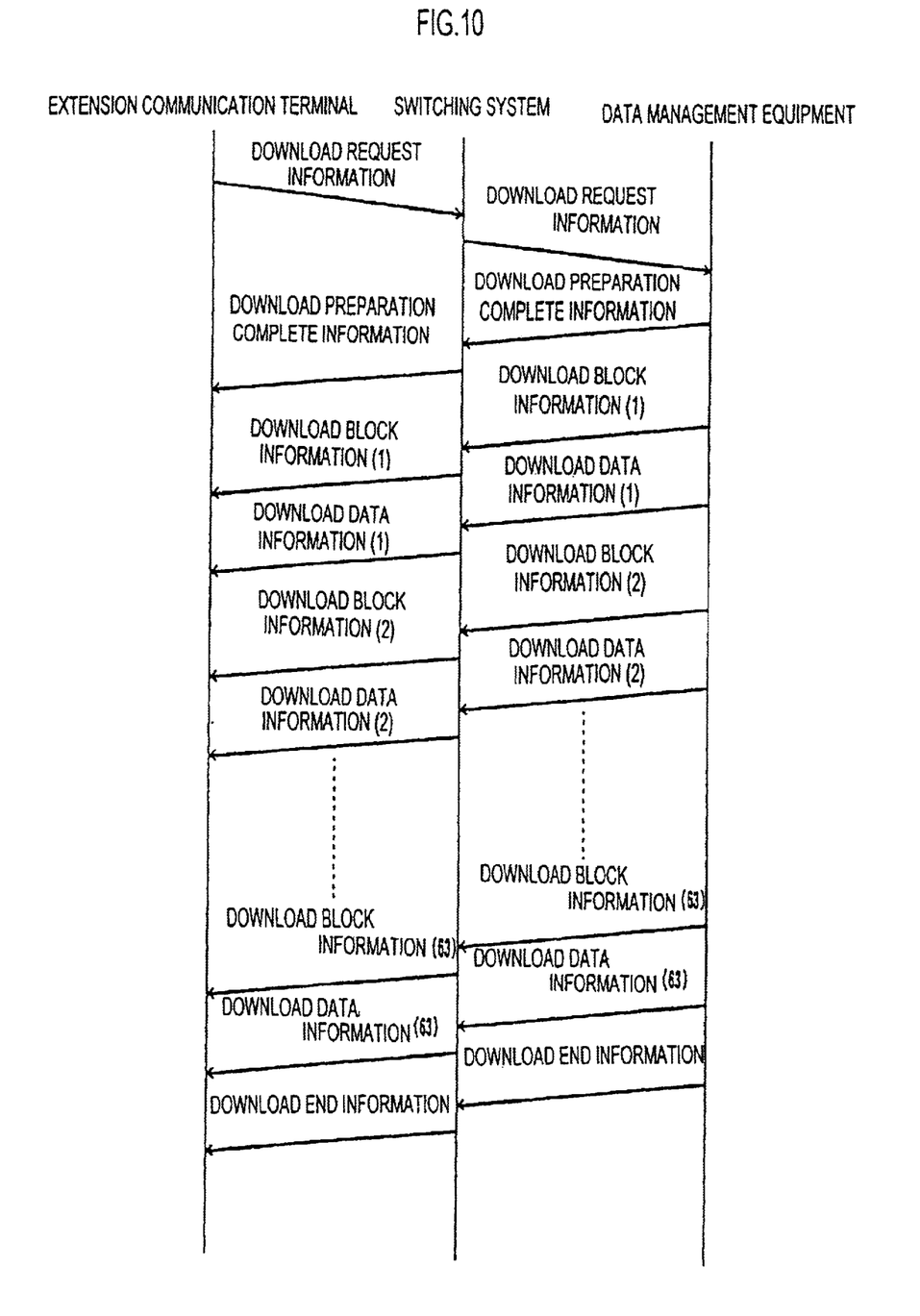
FIG. 10 is a diagram showing the flow of data in the download process.

FIG. 10 is a diagram showing the flow of data in the download process.

As shown in FIG. 10, the download process starts when first, the extension communication terminal $2_1$ to $2_n$ which will perform the download procedure, sends download request information to the switching system 1 via the corresponding dedicated-line circuit $12_1$ to $12_n$.

When the switching system 1 receives the download request information, it transfers the download request information to the data management equipment 3 via the I interface circuit 14 and terminal adapter 15.

When the data management equipment 3 receives the download request information, it starts preparation for the download, and after preparation is complete, it sends download preparation complete information to the switching system 1. When the switching system 1 receives the download preparation complete information, it transfers it to the extension communication terminal $2_1$ to $2_n$ that sent the download request information.

Next, the data management equipment 3 searches from its own memory for station data that corresponds to the new extension number (station data of the extension communication terminal with that extension number before the seat change), and based on the address in the memory of the searched station data, it uses the block correspondence table described above, to search for block numbers that are supposed to be assigned when dividing the station data into multiple blocks. It then sends all of the download block information indicative of the searched block numbers, and the download data information, which is block data (data starting from the address of that block number up to the specified bit that makes one block unit) that is specified by the block numbers.

Then the data management equipment 3 sends download complete information to the extension communication terminal $2_1$ to $2_n$ which sent the download request information.

On the other hand, when the MPU 319 of the extension communication terminal $2_1$ to $2_n$, which sent the download request information, receives the download preparation complete information, it then waits for the download block information and download data information to be sent from the data management equipment 3.

When the MPU 319 receives the download block information (1), it searches from the starting addresses table for each block, which is stored in the ROM 316, for the address which corresponds to the block information specified by the download block information, and then stores the download data information (1), which is sent next, in the searched address. This process is performed for all of the blocks, and then after receiving the download end information, the MPU 319 performs the reset process. By doing so, the extension communication terminals $2_1$ to $2_n$ become capable of using the new extension numbers.

In this embodiment, when an extension communication terminals $2_1$ to $2_n$ receives a seat-change instruction from the function key, it automatically judges whether or not its own station data has changed, and if it has changed, then it uploads the station data to the data management equipment 3.

If two operators, for example, change seats such that they change extension communication terminals $2_1$ to $2_n$ with each other, by both of them just entering a seat-change instruction in the extension communication terminal being used (before the seat change), the extension number at the extension communication terminal after the seat change changes to the extension number of the extension communication terminal that was used before the seat change, and by sending that extension number to the data management equipment 3, it is possible to download from the data management equipment 3 the latest station data for the extension communication terminal that was being used before the seat change.

In other words, even if an operator does not upload the station data to the data management equipment 3 each time the operator changes the station data of the extension communication terminal being used, it is not necessary for the operator to reset the station data after changing seats or to upload the station data after it has been set.

Moreover, an extension communication terminal $2_1$ to $2_n$ divides its own station data into blocks and has a block change (Y/N) table for managing whether or not to change the station data, and it judges in block units whether or not its own station data has been changed. In addition, it uploads to the data management equipment 3 only data corresponding to the blocks of station data that are judged to have been changed.

According to such a procedure, since it is possible to upload only the part that has actually been changed, it is possible to reduce the upload time and to perform the upload more efficiently.

The present invention is not limited to the embodiment described above, but can be modified in various way within the range of the above contents.

For example, in the flowcharts shown in FIG. 7 and FIG. 8, it is possible to display the contents of the processes executed by an extension communication terminal on the display of that extension communication terminal, making it easier for the operator of the extension communication terminal to know the processing status.

Moreover, in the embodiment described above, when changing seats, only the station data (block data) that has actually been changed is uploaded, however, it is possible to upload the entire station data when changes are added to the station data.

Furthermore, the embodiment above was explained in the case of being applied to a dealing telephone system, however, the present invention is not limited to this. The present invention can be applied to various telephone systems wherein the extension communications terminals have station data.

As explained above, according to the present invention, it is not necessary for an operator to reset the station data after changing seats or to upload the station data after it has been set, even if the operator does not upload the station data to the data management equipment each time the operator changes the station data of the extension communication terminal being used.

What is claimed is:

1. A telephone system comprising:
    a plurality of extension communication terminals, each having station data including an extension number and an extension name;
    a data management equipment for managing station data of said plurality of extension communication terminals; and
    a switch which connects said plurality of extension communication terminals and said data management equipment,
    wherein each extension communication terminal comprises:
        data changing means for changing station data of said extension communication terminal,
        storing means for storing change information, when the station data has been changed by said data changing means,
        instruction receiving means for receiving seat-change instructions,
        judgment means for judging whether said station data has been changed by referring to the change information in said storing means, when the seat-change instruction has been received by said instruction receiving means, and
        upload means for uploading said station data to said data management equipment via said switch, when it is judged by said judgment means that said station data has been changed, and
    wherein said data management equipment comprises:
        update means for updating, in accordance with said station data uploaded from said extension communication terminal, station data of the extension communication terminal being managed by the data management equipment.

2. The telephone system of claim 1, wherein said extension communication terminal further comprises:
    change receiving means for receiving changes to said extension number in correspondence to the seat-change instruction received by said instruction receiving means; and
    sending means for sending the changed extension number received by said change receiving means to said data management equipment via said switch, and wherein said data management equipment comprises:
download means for downloading, via said switch, said station data of the extension communication terminal which corresponds to the changed extension number, that was sent from said extension communication terminal, to said extension communication terminal, which sent the changed extension number.

3. The telephone system of claim 1, wherein said extension communication terminal further comprises:
management means for dividing said station data into blocks and managing said blocks of station data,
wherein said storing means stores the change information in units of said blocks of station data, when said station data is changed by said data changing means,
wherein said judgment means judges, in units of said blocks of station data, whether said station data has been changed, by referring, in units of said blocks of station data, the change data in said storing means, when the seat-change instruction is received by said instruction receiving means,
wherein when said station data is judged to have been changed by said judgment means, said upload means uploads to said data management equipment, via said switch, only the data which corresponds to the block of station data judged to have been changed, and
wherein when data is uploaded from said extension communication terminal, said data management equipment updates only data of the extension communication terminal that the data management equipment manages, which corresponds to the uploaded data and which was judged by said judgment means to have been changed, to the upload data.

4. An extension communication terminal having station data including an extension number and an extension name, comprising:
data changing means for changing station data of said extension communication terminal,
storing means for storing change information, when the station data has been changed by said data changing means,
instruction receiving means for receiving a seat-change instruction;
judgment means for judging whether said station data has been changed by referring to the change information in said storing means, when the seat-change instruction is received by said instruction receiving means; and
upload means for uploading, via a switch which accommodates the extension communication terminal, the station data, which has been judged by said judgment means to have been changed, to a data management equipment, which manages the station data of the extension communication terminal connected to and accommodated by the switch.

5. The extension communication terminal of claim 4, further comprising:
management means for dividing the station data into blocks and managing said blocks of station data,
wherein said storing means stores the change information in units of said blocks of station data, when the station data is changed by said data changing means,
wherein said judgment means judges, in units of said blocks of station data, whether the station data has been changed by referring, in units of said blocks of station data, to the change data in said storing means, when the seat-change instruction is received by said instruction receiving means, and
wherein when the station data is judged by said judgment means to have been changed, said upload means uploads to said data management equipment via said switch, only data which corresponds to blocks of station data judged to have been changed.

6. A data upload method for a telephone system which includes a plurality of extension communication terminals, each having station data including an extension number and an extension name, a data management equipment for managing the station data of said plurality of extension communication terminals, and a switch for connecting said plurality of extension communication terminals and said data management equipment, said method comprising:
a first step in which said extension communication terminal changes the station data;
a second step in which said extension communication terminal stores change information therein when the station data is changed;
a third step in which said extension communication terminal judges whether the station data has been changed by referring to the change data in said storing means, when a seat-change instruction is received from an operator;
a fourth step in which the extension communication terminal uploads the station data to said data management equipment via said switch when the station data is judged to have been changed; and
a fifth step in which said data management equipment updates station data uploaded from said extension communication terminal, station data of the extension communication terminal which the data management equipment manages.

* * * * *